United States Patent
Prabhu

(10) Patent No.: US 9,903,409 B2
(45) Date of Patent: Feb. 27, 2018

(54) WATERFALL THREAD FOR INSERTS

(75) Inventor: Sandeep Prabhu, New York, NY (US)

(73) Assignee: ILLINOIS TOOL WORKS, INC., Glenview, IL (US)

(*) Notice: Subject to any disclaimer, the term of this patent is extended or adjusted under 35 U.S.C. 154(b) by 1319 days.

(21) Appl. No.: 13/581,366

(22) PCT Filed: Feb. 25, 2011

(86) PCT No.: PCT/US2011/026212
§ 371 (c)(1),
(2), (4) Date: Aug. 22, 2013

(87) PCT Pub. No.: WO2011/109236
PCT Pub. Date: Sep. 9, 2011

(65) Prior Publication Data
US 2017/0184143 A1    Jun. 29, 2017

Related U.S. Application Data

(60) Provisional application No. 61/309,168, filed on Mar. 1, 2010.

(51) Int. Cl.
*F16B 37/12*    (2006.01)

(52) U.S. Cl.
CPC ......... *F16B 37/127* (2013.01); *F16B 37/122* (2013.01)

(58) Field of Classification Search
CPC ..... F16B 37/122; F16B 37/125; F16B 37/127
USPC ............................ 411/178, 180, 82, 177, 453
See application file for complete search history.

(56) References Cited

U.S. PATENT DOCUMENTS

| | | | | |
|---|---|---|---|---|
| 1,891,895 A | * | 12/1932 | Nagel | F16B 19/02 411/453 |
| 3,092,162 A | * | 6/1963 | Johnsen | F16B 37/048 29/432 |
| 3,477,334 A | * | 11/1969 | Stone | F16B 15/06 206/338 |
| 4,046,181 A | * | 9/1977 | Barnsdale | F16B 37/122 411/180 |
| 5,143,473 A | * | 9/1992 | Harley | F16B 12/2036 403/231 |
| 5,266,258 A | | 11/1993 | Martin | |
| 5,391,031 A | | 2/1995 | Medal | |
| 7,077,613 B2 | | 7/2006 | Rudolph et al. | |

(Continued)

FOREIGN PATENT DOCUMENTS

| | | |
|---|---|---|
| CN | 2583426 Y | 10/2003 |
| CN | 201228709 Y | 4/2009 |

(Continued)

OTHER PUBLICATIONS

An International Search Report, dated May 23, 2011 in International Application No. PCT/US2011/026212.

*Primary Examiner* — Flemming Saether
(74) *Attorney, Agent, or Firm* — Hauptman Ham, LLP

(57) ABSTRACT

An external surface for a fastener insert to be embedded in a component includes waterfall threads extending along an outer surface of the portion to be embedded. The waterfall thread includes a first portion and a second portion, the first portion being more axially oriented on the surface than the second portion, and the second portion being more circumferentially oriented on the surface than the first portion. Continuous transitions are provided between adjacent first and second portions in a thread.

27 Claims, 2 Drawing Sheets

(56) References Cited

U.S. PATENT DOCUMENTS

| | | | |
|---|---|---|---|
| 7,478,987 B2 | 1/2009 | O'Banion et al. | |
| 7,819,614 B2 * | 10/2010 | Versino | F16B 15/06 411/451.3 |
| 8,651,787 B2 * | 2/2014 | Levey | F16B 37/122 411/172 |
| 9,080,593 B2 * | 7/2015 | Levey | F16B 37/125 |
| 2002/0131843 A1 | 9/2002 | Chen-Chi et al. | |
| 2003/0170093 A1 | 9/2003 | Janeway | |
| 2006/0283288 A1 * | 12/2006 | Feltrin | B62M 3/00 74/594.1 |

FOREIGN PATENT DOCUMENTS

| | | |
|---|---|---|
| EP | 0551717 A1 | 7/1993 |
| WO | 03001072 A1 | 1/2003 |

* cited by examiner

WATERFALL THREAD FOR INSERTS

CROSS-REFERENCE TO RELATED APPLICATIONS

The present application is based on International Application No. PCT/US2011/026212, filed Feb. 25, 2011 and claims the benefits of U.S. Provisional Application Ser. No. 61/309,168 filed Mar. 1, 2010.

FIELD OF THE INVENTION

The present invention relates generally to fasteners and fastener systems, and, more particularly, to fastener components of fastener systems that are embedded in another part, often of dissimilar material.

BACKGROUND OF THE INVENTION

It is known to provide fastening systems that include threaded inserts to be embedded in plastic or other components to receive a screw or bolt for holding a second component in an assembly. For example, plastic parts in automobiles, computers, appliances of different types, and various other assemblies are known to be provided with metal inserts having internal threads so that another part can be held thereto by a bolt or screw engaged with the threaded insert. It is also known to anchor a threaded stud in a plastic or other part so that another component can be held thereon by a nut engaged with the threads of the stud.

Various techniques are known for securing the anchored component, such as a threaded insert or stud, in the plastic or other part. Simple threaded engagement can be used, with threads on the outer surface of the insert or stud threaded into the component in which it is held. In a process known as heat-staking, a metal part, such as a threaded female insert or stud, is heated and pushed into the plastic component in which it is held, melting and fusing the interfacing plastic surface thereto. Heat-staking and can be performed relatively inexpensively. Ultrasonic insertion is also known whereby the part is vibrated ultrasonically and pushed into the receiving component. Ultrasonic insertion can be performed relatively quickly, but the process tends to be expensive. In a more simple mechanical process, the component to be anchored is provided with a knurled or other configured outer surface and is simply pushed into the receiving component. Mechanical insertion such as this can be performed quickly, but the machining process required to form the outer surface of the insert adds significantly to overall cost. Further, mechanical insertions tend to channel or direct the material of the anchor component, and it has been difficult to achieve significant holding strength against pullout with push-in inserts. Further, to facilitate easy and rapid machining of inserts, it has been known to use expensive materials, such as brass. Knurls, undercuts and other such formations can be formed readily in brass; however, the costs of parts made of such materials are high.

Advantages can be obtained from providing an insert having a surface configuration that can be manufactured quickly and easily with efficient processes using inexpensive materials and that can be inserted into plastic or other components in a rapid, cost efficient process while providing significant resistance to both pullout and rotation in the completed assembly.

SUMMARY OF THE INVENTION

The waterfall thread disclosed herein can be manufactured efficiently and quickly by rolling processes utilizing dies and less expensive materials, such as steel. The thread is continuous and curved to provide both a substantially axial (vertical) portion and a substantially circumferential (horizontal) portion in a generally continuous thread form. That is, the thread is continuous and transitions between both axial and circumferential portions. Further, the waterfall thread weaves from one side to the other side of the straight-line helical path that would wrap around the insert at the pitch defined by the waterfall thread.

In one aspect of a form thereof, a fastener insert is provided with a body having an external surface and a plurality of spaced threads projecting from and extending along the external surface. Each the thread includes a first portion and a second portion, the first portion being more prominently axially oriented than the second portion and the second portion being more prominently circumferentially oriented than the first portion.

In another aspect of a form thereof, a fastener insert assembly is provided with a component of plastic material, a fastener body having an external surface embedded in the component and a plurality of spaced threads projecting from and extending along the external surface. Adjacent threads of the plurality of spaced threads define inter-thread channels therebetween. Each thread includes a first portion and a second portion, the first portion being more prominently axially oriented than the second portion and the second portion being more prominently circumferentially oriented than the first portion relative to an axial extent of the fastener body. The component is a monolithic body of plastic including solidified rivers of plastic substantially filling the inter-thread channels.

In a further aspect of a form thereof, an external surface is provided for a fastener insert that is a monolithic body including a head and a cylindrical shank extending from the head, the shank having a distal end opposite the head. The external surface has a plurality of spaced threads projecting from and extending along the shank at a thread pitch such that individual threads extend a given length of the shank without fully encircling the shank. Each thread includes a first portion and a second portion, the first portion being more prominently axially oriented than the second portion, and the second portion being more prominently circumferentially oriented than the first portion relative to axial and circumferential directions on the shank. Each thread includes a continuous transition between the first portion and the second portion of the thread.

Other features and advantages of the invention will become apparent to those skilled in the art upon review of the following detailed description, claims and drawings in which like numerals are used to designate like features.

Figure 1:
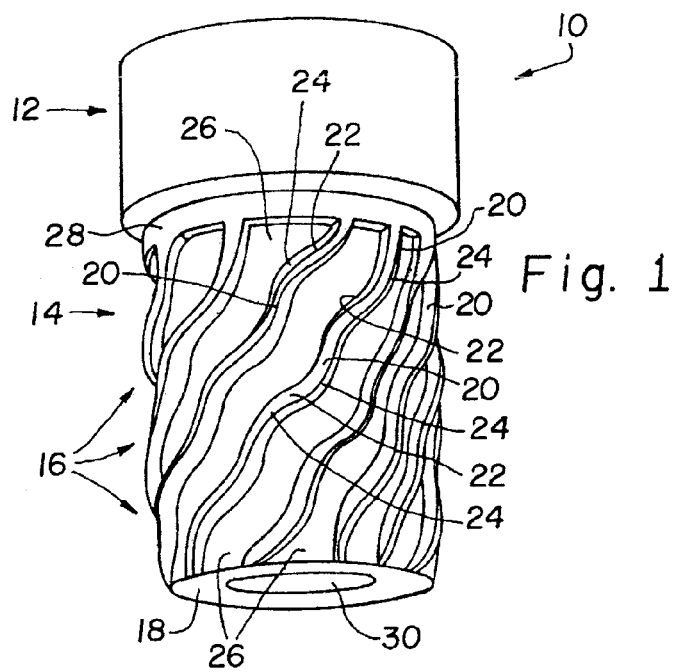
FIG. 1 is a perspective view of an insert having a waterfall thread.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

With reference now more particularly to the drawings and to FIG. 1 in particular, a female threaded insert 10 having a waterfall thread pattern on the exterior thereof is shown. Insert 10 is a monolithic body and includes a head 12 and a shank 14. A plurality of individual threads 16 are provided on shank 14. Each thread is a protrusion or ridge projecting from the outer surface of shank 14. Each thread is continuous from one end to the other and includes pluralities of portions differently angled with respect to the axial and circumferential directions of shank 14. Accordingly, each thread 16 includes substantially more axially oriented portions 20 and substantially more circumferentially oriented portions 22, with continuous transitions 24 interconnecting sequential portions of a thread 16 that are more axially oriented and more circumferentially oriented portions. Individual threads 16 are spaced from each other to define inter-thread channels 26, with each thread 16 extending from distal end 18 to a collar 28 beneath head 12. In the exemplary embodiment shown, shank 14 is hollow having an axial opening 30 there through, which may be threaded or otherwise configured to receive another component in a fastener system to form an assembly.

Insert 10 can be manufactured efficiently from inexpensive metal, such as steel, altered in a rolling process utilizing dies to form the desired surface characteristics. Accordingly, insert 10 can be manufactured efficiently and inexpensively. Of course, more expensive materials can be used for installations requiring specific metal characteristics. Still other materials can be used and manufacturing processes other than a rolling process can also be used if desired.

In the exemplary embodiment of FIG. 1, each thread 16 of insert 10 extends angularly relative to the axial extent of shank 14, winding along a helical path on shank 14 at a given pitch which does not result in a single thread 16 completely encircling shank 14. More axially oriented portions 20 are longer and thus more prominent in the installation than are the more circumferentially oriented portions 22. Adjacent threads 16 are somewhat distantly spaced, defining relatively wide inter-thread channels 26. However, it should be understood that the relative prominence of the more axially oriented portions and the more circumferentially oriented portions can be altered to achieve desired characteristics relative to the resistance to rotation and pullout in the assembly. Further, threads 16 can be provided more closely or more distantly spaced, and the thread height can be varied to achieve desired characteristics. Further, the overall angular orientation or pitch of the thread can be varied from one intended use to another.

Figure 2:
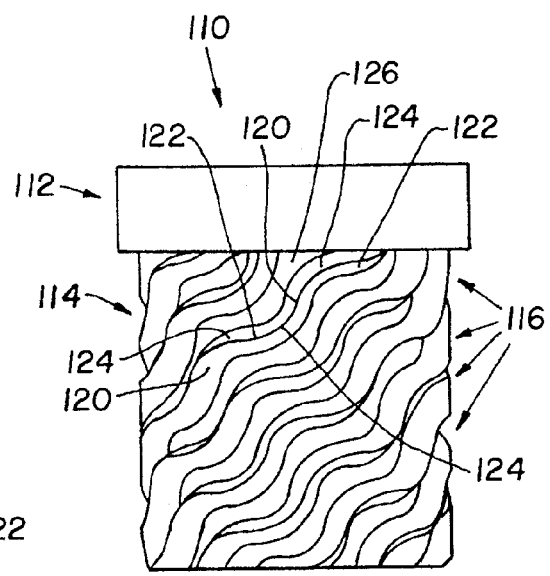
FIG. 2 is an elevational view of another insert having a waterfall thread.
Figure 3:
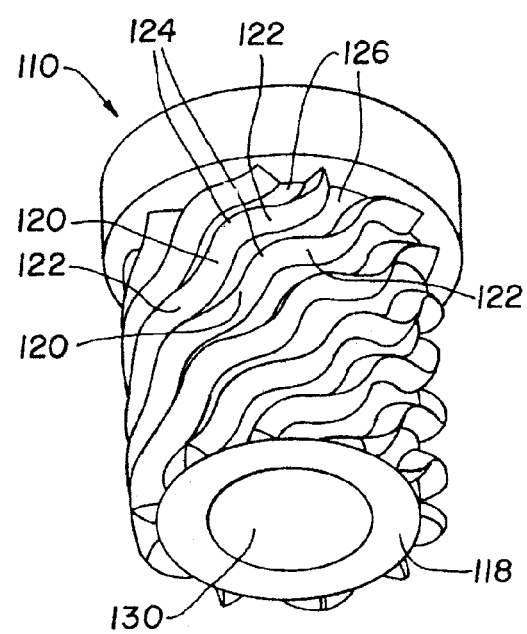
FIG. 3 is a is a perspective view of the insert shown in FIG. 2.
Figure 4:
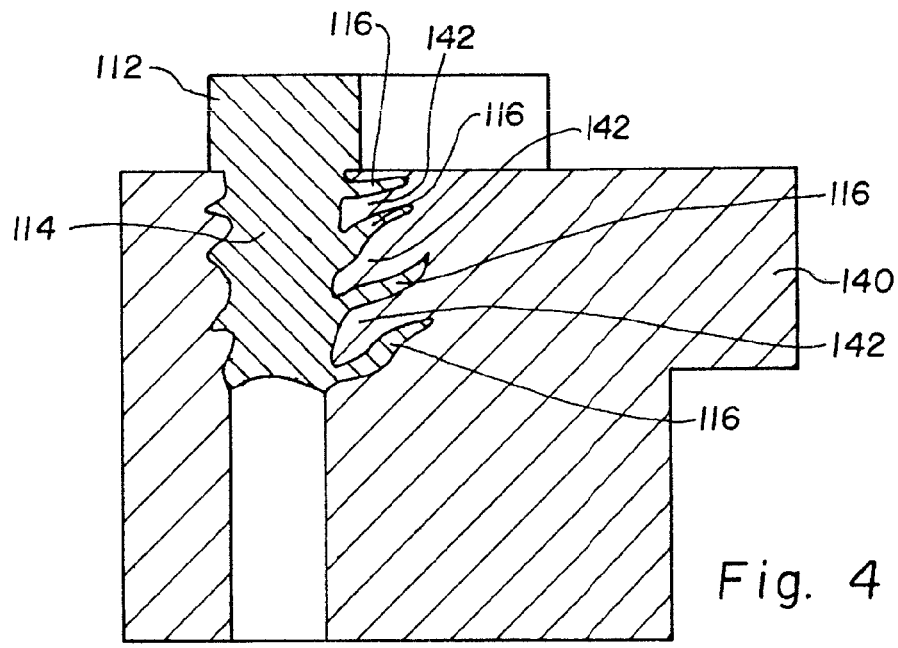
FIG. 4 is a cross-sectional view of an installed insert.

FIGS. 2-4 show another embodiment of a female threaded insert 110, which is a monolithic body of metal such as steel, including a head 112 and a shank 114. A plurality of individual threads 116 extend angularly relative to the axial extent of shank 114 from a distal end 118 to head 112. Each thread 116 includes substantially more axially oriented portions 120 and substantially more circumferentially oriented portions 122, with continuous transitions 124 interconnecting sequential portions within a thread 116 that are more axially oriented and more circumferentially oriented portions. Individual threads 116 are spaced from each other to define inter-thread channels 126. In the exemplary embodiment shown, shank 114 is hollow, having an axial opening 130 there through, which may be threaded or otherwise configured to receive another component in a fastener system to form an assembly.

Insert 110 differs from insert 10 in several ways. Threads 116 are more prominently angled along the helical paths thereof than are threads 16. That is, the overall orientations of threads 16 are more axial than the overall orientations of threads 116; threads 16 and 116 are defined along different thread pitches on shanks 14, 114 respectively. Threads 116 are more closely spaced than are threads 16, and inter-thread channels 126 are more narrow than inter-thread channels 26. Further, more circumferentially oriented portions 122 are more prominent in the overall configurations of threads 116 than are the more circumferentially oriented portions 22 of threads 16. Accordingly, insert 110 may provide greater resistance to pull out in some installations than would insert 10.

As described above, threads 16, 116 extend along helical paths on shanks 14, 114 at different angles or thread pitches. It should be noted that the angular variation from the straight-line helical path or pitch defined by the threads can be to one side or the other of the straight-line helical path or can extend to each side of the straight-line helical path, either equally or predominantly to one side or the other side of the straight-line helical path.

In the cross-sectional view of FIG. 4, insert 110 is shown installed in an anchoring component or body 140 of plastic. During the installation process, which may be performed by heat-staking, rivers 142 of plastic flow into inter-thread channels 126, and substantially fill the channels. Accordingly, rivers 142 are anchored or locked between the threads 116 on either side thereof, and each thread 116 is anchored between rivers 142 of the monolithic body 140.

Figure 5:
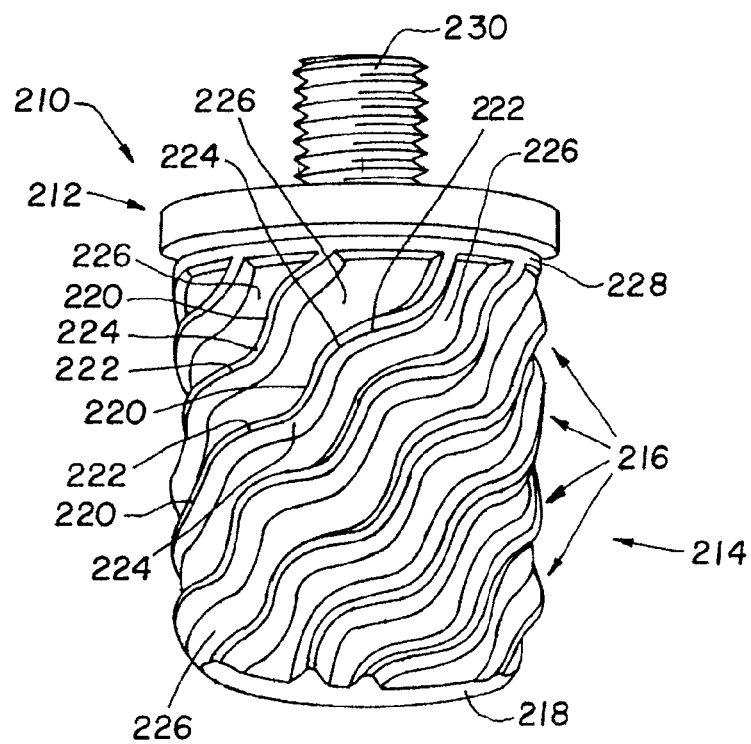
FIG. 5 is an elevational view of another insert with a waterfall thread.

FIG. 5 shows yet another embodiment of a threaded insert 210 which is a monolithic body of metal such as steel, including a head 212 and a shank 214. A plurality of individual threads 216 extend angularly relative to the axial extent of shank 214 from a distal end 218 to head 212. Each thread 216 includes substantially more axially oriented portions 220 and substantially more circumferentially oriented portions 222, with continuous transitions 224 interconnecting sequential portions that are more axially oriented and more circumferentially oriented portions. Individual threads 216 are spaced from each other to define inter-thread channels 226 and extend from distal end 218 to a collar 228 beneath head 212. Insert 210 includes more prominently axial and more prominently circumferential portions 220, 222 then does insert 10 and wider inter-thread channels 226 than does insert 110. Insert 210 is a male threaded stepped insert, having a threaded stud 230 extending axially from head 212 opposite to shank 214.

The inserts described herein can be installed by heat staking in plastic and by other means. Heat-staking works particularly well for installing inserts 10, 110, 210 described herein in that plastic, such as component 140 or another body, into which the insert is installed can melt and flow into the inter-thread channels 26, 126, 226 between threads 16, 116, 216. The most advantageous processes for installing the insert will cause material of the body in which the insert is installed to flow into the inter-thread channels 26, 126, 226 to lock the insert in position. Accordingly, insertion techniques other than heat staking also can be used. Further, direct placement in molded components during the molding process, or subsequent fill of molten material in a pocket including the insert can also suitably anchor inserts as described herein by injecting molten material around the body. Inserts as described herein also may work well when anchored in components of material other than plastic when the material immediately surrounding the insert is provided in a molten or liquid state to fill inter-thread channels 26, 126, 226 and subsequently harden. With good fill in the inter-thread channels 26, 126, 226, resistance to both rotation and pullout is provided by the more axially oriented portions 20, 120, 220 and the more circumferentially oriented portions 22, 122, 222 engaging the confronting rivers of plastic or other material filling the inter-thread channels 26, 126, 226. The substantially more axially oriented portions 20, 120, 220 resist rotation of the insert in the receiving component, and the substantially more circumferentially oriented portions 22, 122, 222 resist pullout of the insert from the receiving component. The length, height and frequency of the substantially more axially oriented portions 20, 120, 220 and the substantially more circumferentially oriented portions 22, 122, 222 can be adjusted to achieve the desired resistance to pullout and resistance to rotation of a particular insert in a specific material.

The external waterfall thread form on an embedded insert can provide both rotation and pullout resistance without complex undercuts on knurled formations, as used previously. As a result, the insert can provide the anti-rotation and pullout resistance performance of expensive, machined inserts, typically of brass, but with the cost advantages of low cost, cold rolled steel.

Inserts having the waterfall threads described herein work well when installed by a process that provides plastic material flow into the inter-thread channels between the threads, where the plastic will freeze after the insert is installed. The thread will then push against the plastic to resist both pullout and rotation. The waterfall thread forms described herein can work well for many types of inserted fastener components, including the female threaded inserts 10, 110 described herein for use as screw and bolt anchors or anchors for other components having threaded elements thereon. The thread can be used also for male threaded inserts such as insert 210 described herein for threaded engagement with a nut or other threaded component. It should be understood that the waterfall threads described herein can be used also on the embedded portions of many anchored male and female components, such as, for example, male or stud components of other types such as ring studs, ball-ended studs designed to snap-fit into other components, or an anchored stud having any other type of end configuration suitable for a purpose. For example, the stud could define a hook, a nail point, an electrical contact or other configuration, whether complex or simple. Other embedded male components, female components and neutral anchored devices also can use waterfall threads as described herein. Further, the insert surfaces disclosed herein can be used for other than straight shanks as well as stepped shanks, and can be provided on all or just a portion of the embeddable length of an insert.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An apparatus, comprising:
an insert, including:
a plurality of threads; and
a cylindrical thread support, wherein the plurality of threads are supported by the thread support such that the threads extend about at least a portion of the cylindrical profile of the thread support, wherein
respective threads of the plurality of threads extend in changing directions with respect to location along the longitudinal axis of the cylindrical thread support such that a direction of extension, as measured from a plane normal to the longitudinal axis of the cylindrical thread support, varies from prominently circumferentially oriented with values less than 45 degrees to prominently vertically oriented with values more than 45 degrees and,
the plurality of threads and the cylindrical thread support are embeddable in a body.

2. The apparatus of claim 1, wherein:
there are at least 8 threads in the plurality of threads.

3. The apparatus of claim 2, wherein:
the respective threads of the plurality of threads extend in changing directions with respect to location along the longitudinal axis of the cylindrical thread support such that a direction of extension, as measured from a plane normal to the longitudinal axis of the cylindrical thread support, never has a value of 90 degrees.

4. The apparatus of claim 2, wherein:
the respective threads of the plurality of threads extend relative to the longitudinal axis of the thread support such that a direction of extension does not include a component normal to the longitudinal axis.

5. The apparatus of claim 1, wherein:
the respective threads of the plurality of threads extend in changing directions with respect to location along the longitudinal axis of the cylindrical thread support such that a direction of extension, as measured from a plane normal to the longitudinal axis of the cylindrical thread support, varies from values less than 45 degrees to values greater than 45 degrees at least three times.

6. The apparatus of claim 1, wherein:
the respective threads of the plurality of threads extend in changing directions with respect to location along the longitudinal axis of the cylindrical thread support such that a direction of extension, as measured from a plane normal to the longitudinal axis of the cylindrical thread support, never has a value of 90 degrees.

7. The apparatus of claim 1, wherein:
the respective threads of the plurality of threads extend relative to the longitudinal axis of the thread support such that a direction of extension does not include a component normal to the longitudinal axis.

8. The apparatus of claim 1, wherein:
the threads have a thread height that is a fraction of the maximum diameter of the cylindrical thread support normal to the longitudinal axis thereof.

9. The apparatus of claim 1, wherein:
the insert has a hollow cavity extending therethrough.

10. The apparatus of claim 1, wherein:
the threads extend a distance relative to the longitudinal axis of the insert that is a majority of the total distance of the insert and the respective threads extend only partly about the longitudinal axis of the insert.

11. The apparatus of claim 1, wherein:
the insert is configured with a blunt insertion end;
of the total longitudinal distance of the insert, the threads extend more than half of that distance; and
the insert has a collar at an end opposite the blunt end, wherein the collar has a uniform outer profile relative to the circumference thereof.

12. The apparatus of claim 1, each said thread including a continuous transition between said prominently circumferentially oriented portion and said prominently vertically oriented portion of said thread.

13. The apparatus of claim 1, each said thread including a plurality of said prominently circumferentially oriented portions and a plurality of said prominently vertically oriented portions.

14. The apparatus of claim 13, including continuous transitions between adjacent said prominently circumferentially oriented portions and said prominently vertically oriented portions in said threads.

15. The apparatus of claim 1, including an axial opening in said insert.

16. The apparatus of claim 1, including a head and a shank, said threads extending the length of said shank.

17. The apparatus of claim 16, said head including a collar and said threads extending from a distal end of said shank to said collar.

18. The apparatus of claim 1, including a stud opposite said embeddable body.

19. A fastener insert assembly, comprising:
a component of plastic material;
a fastener body having an external surface embedded in said component;
a plurality of spaced threads projecting from and extending along said external surface, adjacent threads of said plurality of spaced threads defining inter-thread channels therebetween;
respective threads of the plurality of threads extend in changing directions with respect to location along the longitudinal axis of the cylindrical thread support such that a direction of extension, as measured from a plane normal to the longitudinal axis of the cylindrical thread support, varies from prominently circumferentially oriented with values less than 45 degrees to prominently vertically oriented with values more than 45 degrees, said component including solidified rivers of plastic substantially filling said inter-thread channels.

20. The fastener insert assembly of claim 19, including continuous transitions between adjacent said prominently circumferentially oriented portions and said prominently vertically oriented portions in said threads.

21. The fastener insert assembly of claim 20, including an axial opening in said fastener body.

22. The fastener insert assembly of claim 20, said fastener body including a head and a shank, said external surface being an external surface of said shank, and each said thread extending the length of said shank without completely encircling said shank.

23. The fastener insert assembly of claim 22, including a collar adjacent said head and said threads extending from a distal end of said shank to said collar.

24. An external surface on a fastener insert that is a monolithic body including a head and a cylindrical shank extending from the head, the shank having a distal end opposite the head, said external surface comprising:
a plurality of spaced threads projecting from and extending along the shank at a thread pitch such that individual threads extend a given length of the shank without fully encircling the shank;
respective threads of the plurality of threads extend in changing directions with respect to location along the longitudinal axis of the cylindrical thread support such that a direction of extension, as measured from a plane normal to the longitudinal axis of the cylindrical thread support, varies from prominently circumferentially oriented with values less than 45 degrees to prominently vertically oriented with values more than 45 degrees; and
each said thread including a continuous transition between said prominently circumferentially oriented portion and said prominently vertically oriented portion of said thread.

25. The external surface on a fastener insert of claim 24, each said thread including a plurality of said prominently circumferentially oriented portions and a plurality of said prominently vertically oriented portions.

26. The external surface on a fastener insert of claim 25, including continuous transitions between adjacent said prominently circumferentially oriented portion and said prominently vertically oriented portion in said thread.

27. The external surface on a fastener insert of claim 24, including portions of said threads on opposite sides of a line defining a straight-line helical path of the thread.

* * * * *